United States Patent [19]

Laughlin

[11] Patent Number: 4,792,675
[45] Date of Patent: Dec. 20, 1988

[54] DIFFUSED SURFACE RADIANT ENERGY RECEIVER

[75] Inventor: Richard H. Laughlin, Richardson, Tex.

[73] Assignee: Varo, Inc., Garland, Tex.

[21] Appl. No.: 11,628

[22] Filed: Feb. 6, 1987

[51] Int. Cl.$^4$ ............................................... G01B 11/26
[52] U.S. Cl. ...................................... 250/227; 356/152
[58] Field of Search .................. 250/227, 578, 201 R, 250/203 R; 350/96.1, 96.24–96.27; 356/152, 141

[56] References Cited

U.S. PATENT DOCUMENTS

| | | | |
|---|---|---|---|
| 3,885,878 | 5/1975 | Ishak | 250/227 |
| 3,981,590 | 9/1976 | Perkins | 250/227 |
| 3,992,099 | 11/1976 | Laughlin | 356/73 |
| 4,625,108 | 11/1986 | Nestel et al. | 250/227 |
| 4,674,874 | 6/1987 | Halldorsson et al. | 250/227 |

*Primary Examiner*—Edward P. Westin
*Assistant Examiner*—Charles F. Wieland
*Attorney, Agent, or Firm*—Jerry W. Mills; Jefferson Perkins

[57] ABSTRACT

A method and apparatus for receiving radiant energy is provided having a linear sensitivity to the angle of arrival of the radiant energy with that linearity relatively unaffected by wavelength and polarization variations in the radiant energy. An optical fiber is provided having a receiving end disposed to receive radiant energy and also having a transmitting end. A diffusing surface for receiving radiant energy is disposed on the receiving end of the optical fiber. A detector receives radiant energy from the transmitting end of the optical fiber.

18 Claims, 1 Drawing Sheet

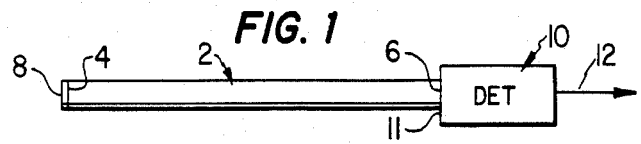

DIFFUSED SURFACE RADIANT ENERGY RECEIVER

TECHNICAL FIELD OF THE INVENTION

This invention relates to methods and apparatus for detecting optical energy, and more particularly to electro-optics and threat warning systems which use diffused surface apparatus and methods for receiving radiant energy to determine the angle of arrival and/or the wavelength of the radiant energy.

BACKGROUND OF THE INVENTION

U.S. Pat. No. 3,992,099 to Laughlin, incorporated herein by reference, discloses a source discriminator for measuring the angle of arrival and wavelength of beams of radiant energy. Such a system is useful in combat applications to provide information about the source of ranging laser beams and the like. The source discriminator described in the Laughlin patent includes first and second planar radiant energy detectors transversely oriented relative to one another to receive radiant energy. Each of the detectors produces an electrical output signal corresponding to radiant energy which impinges on the detector. The output signals are used to determine the angle of arrival and wavelength of the radiant energy impinging on the planar detectors. The detectors have an angular response approximated by the cosine function.

However, it has been found that the typical prior planar detectors used in the systems such as disclosed in the Lauglin U.S. Pat. No. 3,992,099 include a passivating overcoat on the surface of the detector. The passivating overcoat acts as an optical "transmission line" and thus by the electro-magnetic field theory, varies in its transmission of radiant energy as a function of the wavelength and polarization of the optical energy passing through it. The passivating overcoat thus tends to prevent a true cosine function angular response by the system. Variations caused by the passivating overcoat thus adversely affect the accuracy of results determined by prior detecting systems.

It is also been found that reflections from the detector mountings and reflections and shadowing by the surfaces of the detector housing and detector electrode post used with prior systems can adversely effect the accuracy of the prior systems.

The need has thus arisen for an improved radiant eergy discriminator which provides a true cosine angular response and which minimizes or eliminates the effects of the passivating overcoat of the planar detectors and reflections or shadowing by the detector mounting, housing and electrode post.

SUMMARY OF THE INVENTION

The present invention comprises apparatus and methods for receiving and directing radiant energy to a radiant energy detector. An optical fiber in conjunction with a diffusing surface is provided, the arrangement having the specific characteristics of a linear sensitivity to the angle of arrival of light approximating the cosine function with that linearity relatively unaffected, for determining the angle of arrival, by wavelength and polarization variations of the light.

An optical fiber is provided having a receiving end and a transmitting end. Disposed on the receiving end of the optical fiber is a diffusing surface for receiving radiant energy. A transmitting end of the optical fiber is disposed to transmit radiant energy to a detector which produces signals responsive to the radiant energy received by the detector. The signals produced by the detector are processed to make a variety of determinations with regard to the radiant energy received. One application of such processing is a source discriminator which determines both the wavelength and the direction of arrival of radiant energy received on the diffusing surface disposed on the optical fiber.

The diffusing surface can be provided by a number of techniques including grinding, chemical etching, chemical etching with deposition of diffusing particles or application of ready made diffusing surfaces or other means known to the art.

BRIEF DESCRIPTION OF THE DRAWINGS

For a more complete understanding of the invention and the advantages thereof, reference is now made to the following description, taken in conjunction with the accompanying drawings in which:

FIG. 1 is a diagrammatic side view of apparatus for receiving and directing radiant energy to a detector in accordance with one embodiment of the present invention;

FIG. 2 is a diagramatic representation of a receiving end of an optical fiber having disposed thereon a diffusing surface in accordance with one embodiment of the present invention.

FIG. 3 is a diagrammatic representation of a receiving end of an optical fiber having disposed thereon a ready made diffusing surface in accordance with another embodiment of the present invention.

FIG. 4 is a top, somewhat diagrammatic, view of apparatus for receiving radiant energy and directing the same to a radiant energy detector in accordance with one embodiment of the present invention;

FIG. 5 is an isometric drawing of an elevated front view of an array of optical fiber receiving ends disposed on diffusing surfaces in accordance with one embodiment of the present invention.

FIG. 6 is a diagrammatic side view of the embodiment of the present invention shown in FIG. 5.

FIG. 7 is a diagrammatic side view of apparatus for receiving and directing radiant energy to a radiant energy detector wherein the transmitting end of the optical fiber is spaced apart from the receiving surface of the detector, in accordance with one embodiment of the present invention;

FIG. 8 is a diagrammatic side view of apparatus for receiving and directing radiant energy to a radiant energy detector wherein a lens is disposed between the transmitting end of the optical fiber and the receiving surface of the radiant energy detector in accordance with one embodiment of the present invention.

DETAILED DESCRIPTION OF THE INVENTION

FIG. 1 shows a diagrammatic side view of an apparatus for receiving and directing radiant energy to a radiant energy detector, in accordance with one embodiment of the present invention. An optical fiber 2 is provided having a receiving end 4 disposed to receive radiant energy and a transmitting end 6 disposed to transmit radiant energy. A diffusing surface 8 is disposed on the rcceiving end 4 of the optical fiber 2. A detector 10 for detecting radiant energy having a detector surface 11 is disposed to receive radiant energy from transmitting end 6 on detector surface 11. Detector 10 generates signals responsive to radiant energy received on detector surface 11 and communicates these signals via communication channel 12 to a processing apparatus not shown in FIG. 1.

The term "diffusing surface" as used herein will be understood to mean a transmitting diffusing surface designed to transmit radiant energy through the diffusing surface as compared to a reflecting diffusing material which is not designed to transmit radiant energy through the material. The diffusing surface serves to diffuse radiant energy passing through the surface by multiple scattering of the radiant energy by particles in or other characteristics of the diffusing surface. The diffusing surface used in the present invention can be an optical element that is coupled to the receiving end of the optical fiber or it can be the result of a treatment to the end of the fiber itself. Diffusing surfaces are known in the art and can be prepared by grinding a glass, plastic or other surface, etching the surface by a chemical or other means or depositing radiant energy or light scattering materials on a carrier such as a glass or plastic plate. Examples of such light scattering materials include opal, $TiO_3$, $AlO_3$ or other materials known in the art. In some cases, such light scattering materials are applied to surfaces which have been etched or ground. Additionally, a diffusing surface may be provided by use of a material which in itself serves to scatter radiant energy transmitted through the substance. One example of a diffusing surface is an opal glass which comprises an opal layer of five one thousandths of an inch thickness deposited on top of a clear glass carrier plate ten one thousandths of an inch thick. An example of commercially available opal glass is Part No. 214.9 from Edmund Scientific Corporation.

Disposing the diffusing surface on the receiving end of the optical fiber or, as shown in embodiments described hereinafter, on other surfaces which receive radiant energy in the apparatus, enhances the transmission of radiant energy through those surfaces and reduces complications arising from surface effects including those from the passivating overcoat on the detector or from reflections. The present invention thus provides a method and apparatus having the specific characteristic of a linear sensitivity to the angle of arrival of light approximating the cosine function with that linearity relatively unaffected, for determining the angle of arrival, by wavelength and polarization variations of the light. This is in contrast to prior devices wherein the transmission of radiant energy on the receipt of the energy at the device varies as a function of the wavelength and the polarization of the radiant energy being received with the effect that the sensitivity of the device for determining the angle of arrival of radiant energy is relatively non-linear.

Diffusing surface 8 thus provides an optimum receiving surface on the receiving end 4 at a location remote from the detector surface, and thus avoids inaccuracies which would otherwise be introduced by reflections and shadowing by the detector surface, mountings and electrode posts and also arising by surface effect complications.

The fiber optics can be of varying lengths from as short as three to five millimeters or less, up to several meters or more in length. One embodiment utilized a fiber optic length of about ten centimeters.

In the embodiment of FIG. 1, radiant energy is received by the diffusing surface 8 disposed on receiving end 4 from a radiant energy source not shown in FIG. 1. At least a portion of the radiant energy received at receiving end 4 is transmitted along the longitudinal axis (not shown in FIG. 1) of fiber optic 2 to transmitting end 6, and at least a portion of this radiant energy is transmitted from transmitting end 6 to the detector surface 11 of detector 10. Detector 10 generates a signal responsive to the radiant energy received at detector surface 11 and communicates this signal to standard processing means (not shown in FIG. 1) via communication channel 12.

FIG. 2 is a diagrammatic view of the receiving end portion of an optical fiber having a diffusing surface disposed thereon according to one embodiment of the present invention. Optical fiber 20 has a receiving end 21 on which is disposed a diffusing surface 22. Diffusing surface 22 is prepared by first polishing the receiving end 21 of the optical fiber 20, then chemically etching receiving end 21 to provide a diffusing surface. A variety of substances known to the art may be used to accomplish this etching, including "Armour Etch" an ammonia flouride glass etching cream from Armour Products, Midland Park, New Jersey. A coating of "Armour Etch" etching cream covering receiving end 21 is applied to receiving end 21 and allowed to stand for three minutes, after which it is washed away with water. An etched surface is thereby provided on receiving end 21. The diffusing surface 22 can be further enhanced by the application of a flashed opal or other diffusing material as known in the art on the polished or etched receiving end of the optical fiber 20.

FIG. 3 is a diagrammatic view of the receiving end of an optical fiber in accordance with another embodiment of the present invention. Optical fiber 24 has receiving end 26 and disposed on receiving end 26 is a diffusing surface 28 which has been attached to or otherwise disposed on receiving end 26. An example of such a diffusing surface which can be disposed on receiving end 26 is a flashed opal layer on a supporting sheet of glass, plastic or other material. Other diffusing materials known in the art could also be used on the supporting sheet. Also a ground or etched glass surface can be used as well as other devices known in the art.

FIG. 4 is a top, somewhat diagrammatic view of apparatus for receiving and directing radiant energy to a radiant energy detector in accordance with one embodiment of the present invention. An optical fiber 30 includes a receiving end 32 disposed to receive radiant energy and a transmitting end 34 disposed to transmit radiant energy. Disposed on receiving end 32 is a diffusing surface 35 for receiving radiant energy. A detector 36 is disposed to receive radiant energy from transmitting end 34 and is adapted to generate signals responsive to radiant energy received. Th signals generated are communicated via communication channel 37 to a processor 38. A second optical fiber 40 includes a receiving end 42 for receiving radiant energy and a transmitting end 44. Disposed on receiving end 42 is a diffusing surface 46 for receiving radiant energy. A detector 48 is disposed to receive radiant energy from transmitting end 44 and is adapted to generate signals responsive to radiant energy received, the signals generated being communicated via communication channel 49 to processor 38.

It will be understood that optical fibers 30 and 40 can be the top optical fibers of vertical arrays of first and second pluralities of optical fibers as disclosed in the Applicant's copending application Ser. No. 011,738 incorporated herein by reference and also as shown in FIGS. 5 and 6 below. Where more than one optical fiber is used, it is possible that one diffusing surface can be used for more than one optical fiber.

FIG. 5 is an isometric drawing of an elevated front view of an array of a first and second plurality of optical fiber receiving ends disposed on common diffusing surfaces in accordance with one embodiment of the present invention. A first plurality of optical fibers 50a-50g have, respectively, receiving ends 52a-52g disposed on a first common diffusing surface 53. A second plurality of optical fibers 54a-g have respectively receiving ends 56a-56g disposed on a second common diffusing surface 57. The first and second common diffusing surfaces 53 and 57 may comprise any diffusing surface known in the art and appropriate for this application including but not limited to ground or etched glass or plastic, flashed opal or other coatings on glass or plastic carriers.

FIG. 6 is a diagrammatic side view of the first plurality of optical fibers of the embodiment shown in FIG. 5. As is shown, the first plurality of optical fibers 50a-50g have receiving ends 52a-52g disposed on first common diffusing surface 53. Optical fibers 50a-50g also have transmitting ends 51a-51g each disposed to transmit radiant energy to one of a first plurality of detectors 55a-55g. It will be understood that detectors 55a-55g, as shown in FIG. 4 and as described in Applicant's copending application referenced above, may be connected to summing means and processors not shown in FIG. 6 and may also comprise a single detector to which each of transmitting ends 51a-51g direct radiant energy Alternatively, a separate diffusing surface may be provided for each of receiving ends 52a-52g.

FIG. 7 is a diagrammatic side view of another embodiment of the present invention wherein the transmitting end of the optical fiber is spaced apart from the receiving surface of the detector. An optical fiber 80 includes a receiving end 82 and a transmitting end 84. Disposed on receiving end 82 is a diffusing surface 86. Detector 90 has a receiving surface 91 disposed to receive radiant energy from transmitting end 84. Signals generated by the detector 90 are communicated to processing apparatus not shown in FIG. 7 via communication channel 94.

FIG. 8 shows another embodiment of the present invention wherein a lens is disposed between the transmitting end of the optical fiber and the detector. Optical fiber 100 has a receiving end 102 and a transmitting end 104. Disposed on receiving end 102 is a diffusing surface 106. Detector 110 has a receiving surface 111 disposed to receive radiant energy from transmitting end 104. Signals generated by the detector are communicated to a processing means not shown in FIG. 8 via communication channel 114. Disposed between transmitting end 104 and receiving surface 111 is a lens 116 in order to collimate the light to the detector 110.

The invention has application for receiving and transmitting radiant energy from the ultraviolet range specifically through the infrared range and additionally through millimeter waves. The optical fibers can be disposed in arrays as disclosed in Applicant's copending application Ser. No. 07/011738 and such arrays can use a common diffusing surface, one embodiment of which is shown in FIG. 5.

While the present invention has been described with respect to preferred embodiments, it is to be understood that the invention is capable of numerous modifications by arrangement and changes that are within the scope of the invention as defined by the appended claims.

What is claimed is:

1. Apparatus for receiving and sensing radiant energy, comprising:
    first and second optical fibers each having a receiving end disposed to receive radiant energy and a transmitting end;
    first and second diffusing surfaces for receiving radiant energy disposed on respective receiving ends of said first and second optical fibers, said first and second surfaces disposed in intersecting planes;
    each diffusing surface transmitting a portion of the radiant energy impinging thereon as a predetermined function of the angle of incidence of said energy to said surface; and
    a first and second detector to receive said portions of radiant energy from said transmitting ends of said first and second optical fibers respectively and determining the angle of incidence of said radiant energy from said portions based on said function.

2. The apparatus of claim 1, wherein said diffusing surfaces each comprise an optical element coupled to said receiving end.

3. The apparatus of claim 1, wherein each said diffusing surface comprises an etched surface deposited with radiant energy scattering materials.

4. The apparatus of claim 2, wherein said optical element comprises an opal glass.

5. Apparatus for receiving radiant energy for use in a radiant energy discriminator which determines the angle of arrival of radiant energy, comprising:
    a first plurality of optical fibers, each having a receiving end and a transmitting end, each said receiving end disposed parallel to a first common plane for receiving radiant energy;
    at least one first detector disposed to receive radiant energy from at least one of said first plurality of transmitting ends;
    a second plurality of optical fibers, each having a receiving end and a transmitting end, each said receiving end disposed parallel to a second common plane for receiving radiant energy;
    at least one second detector disposed to receive radiant energy from at least one of said second plurality of transmitting ends;
    a diffusigg surface disposed on ones of said receiving ends of said first plurality of optical fibers;
    a diffusing surface disposed on ones of said receiving ends of said second plurality of optical fibers;
    said first and second common planes intersecting at a predetermined angle with each other.

6. The apparatus of claim 5, further comprising:
    a first common diffusing surface, with each receiving end of said first plurality of optical fibers disposed on said first common diffusing surface;
    a second common diffusing surface, with each receiving end of said second plurality of optical fibers disposed on said second common diffusing surface.

7. The apparatus of claim 5, wherein said apparatus provides a linear sensitivity to the angle of arrival of radiant energy approximating the cosine function with said linearity relatively unaffected, for determining the angle of arrival, by wavelength and polarization variations of the radiant energy.

8. A method for receiving and transmitting radiant energy for use in conjunction with source discriminator radiant energy detector apparatus, comprising:

disposing receiving ends of a first plurality of optical fibers parallel to a first common plane for receiving radiant energy;

disposing at least one first diffusing surface between a radiant energy source and said receiving ends of said first plurality of optical fibers;

disposing transmitting ends of said first plurality of optical fibers to transmit radiant energy to at least one first radiant energy detector;

disposing receiving ends of a second plurality of optical fibers parallel to a second common plane for receiving radiant energy;

disposing at least one second diffusing surface between said radiant energy source and said receiving ends of said second plurality of optical fibers;

disposing transmitting ends of said second plurality of optical fibers to transmit radiant energy to at least one second energy detector;

orienting said first common plane at a predetermined angle with regard to said second common plane;

generating a signal from said at least one first radiant energy detector responsive to radiant energy transmitted from said at least one first plurality of optical fibers to said at least one first radiant energy detector;

generating a signal from said one second radiant energy detector responsive to radiant energy transmitted from said second plurality of optical fibers to said at least one second radiant energy detector.

9. The method of claim 8, further comprising:

processing said signals generated by said first and second detectors to determine the angle of arrival of radiant energy received at the receiving ends of said first and second pluralities of optical fibers.

10. The method of claim 9, further comprising:

disposing a separate diffusing surface on each of said receiving ends of said first and second pluralities of optical fibers.

11. The method of claim 10, further comprising:

orienting said transmitting ends of said first plurality of optical fibers at a position spaced apart from said of least one first detector;

orienting said transmitting ends of said second plurality of optical fibers at a position spaced apart from said second detector.

12. The method of claim 11, further comprising disposing at least one lens between said transmitting ends of said first plurality of optical fibers and said first detector;

disposing a second lens between said transmitting ends of said second plurality of optical fibers and said second detector;

transmitting radiant energy from said transmitting ends of said first plurality of optical fibers through said first lens to said first detector;

transmitting radiant energy from said transmitting ends of said second plurality of optical fibers through said second lens to said second detector.

13. The method of claim 9, wherein said method provides a linear sensitivity to the angle of arrival of radiant energy approximating th cosine function with said linearity relatively unaffected, for determining the angle of arrival, by wavelength and polarization variations in said radiant energy.

14. The apparatus of claim 1, said apparatus having the characteristic of a linear sensitivity to the angle of arrival of light approximating the cosine function.

15. The apparatus of claim 5, wherein said receiving ends of said first plurality of optical fibers are crossed and interleaved with said receiving ends of said second plurality of optical fibers.

16. The apparatus of claim 6, wherein said receiving ends of said first plurality of optical fibers are crossed and interleaved with said receiving ends of said second plurality of optical fibers.

17. The method of claim 8, further comprising:

interleaving and crossing said receiving ends of said first plurality of optical fibers with said receiving ends of said second plurality of optical fibers.

18. The method of claim 10, further comprising:

interleaving and crossing said receiving ends of said first plurality of optical fibers with said receiving ends of said second plurality of optical fibers.

* * * * *